United States Patent Office 3,582,489
Patented June 1, 1971

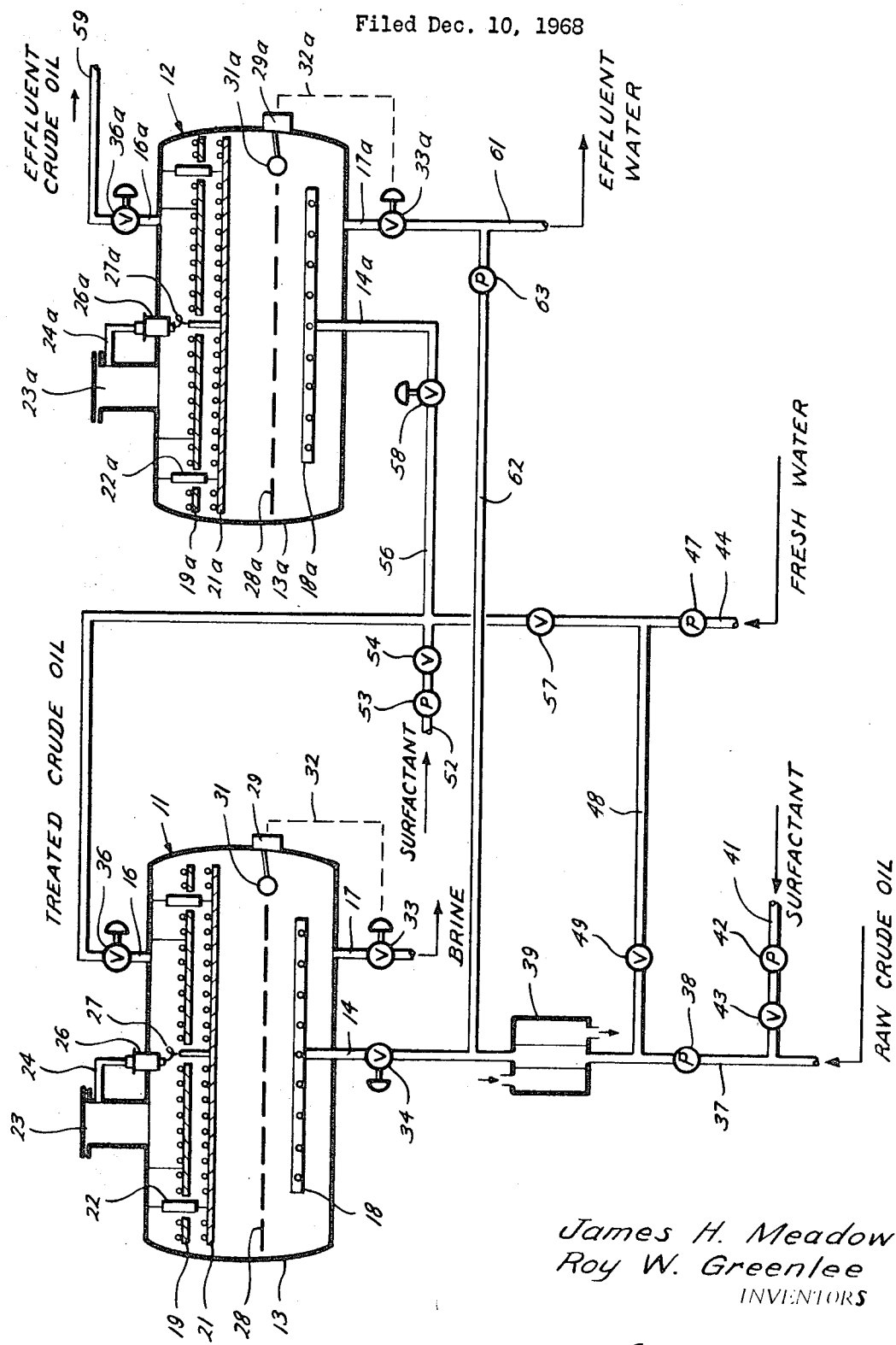

3,582,489
PROCESS FOR CRUDE OIL PURIFICATION
James H. Meadow, Houston, Tex., and Roy W. Greenlee, Maplewood, Mo., assignors to Petrolite Corporation, St. Louis, Mo.
Filed Dec. 10, 1968, Ser. No. 782,534
Int. Cl. B03c 5/00
U.S. Cl. 204—190       10 Claims

ABSTRACT OF THE DISCLOSURE

A process for removing metal-containing compounds from crude oil which compounds adversely affect subsequent processes in a refinery. Water is dispersed into the crude oil in the presence of an oxyalkylated amine-derived surfactant. The resultant mixture is resolved electrically into a purified crude oil phase and a water phase containing the removed metal-containing compounds. Water, in amounts up to about 10 volume percent, is preferably admixed with the crude oil after the addition of the surfactant. The surfactant has hydrophilic-hydrophobic properties for removing metal-containing compounds from the crude oil during electrical resolution of dispersed water. Preferably, the surfactant is an oxyalkylated polyalkylene polyamine, and in particular, the base-catalyzed, reaction product of tetraethylene pentamine which has been oxyalkylated with propylene oxide and ethylene oxide. The present process is particularly effective in removing iron compounds from crude oil.

BACKGROUND OF THE INVENTION

(1) Field of the invention

The present invention relates to the removal of inorganic metal-compounds, including silica and silicates, from crude oil. More particularly, it relates to the removal from crude oil of metal-containing compounds which adversely affect catalytic cracking operations in a refinery.

(2) Description of the prior art

Vast quantities of crude oil are processed into a multitude of valuable products in oil refineries throughout the world. Crude oils undergo purification steps for the removal of connate solids such as silt, sand, iron oxides and sulfides. Also, the crude oil usually contains a sufficient quantity of salt that must be removed in a desalting operation. Desalting generally consists of intimately admixing a small amount of water, usually up to about 10% by volume, into the crude oil. The resultant dispersion then is separated into crude oil and water phases. The most convenient means for separating the dispersion is with an electric field which produces a purified crude oil phase and an aqueous phase in which the salt content of the crude has been concentrated. The desalting operations are capable of reducing the salt content of crude oil to less than a few tenths percent of salt per thousand barrels of crude oil.

The desalting operation can remove various connate solids such as silt, sand and iron oxides and sulfides which are normally associated with water, or particles that become water-wetted in the synthetic dispersion formed by mixing crude oil and water. These solids, especially metal-containing compounds, should be removed from the crude oil before it is subjected to various catalytic cracking procedures. These metal-containing compounds, especially iron, are catalyst poisons and therefore adversely affect the catalytic cracking processes. For example, iron compounds severely reduce the efficiency of an alumina based cracking catalyst and increase the difficulty in regenerating the catalyst after it has been used. For this reason, it is most desirable to remove these metal-containing compounds from the crude oil.

Many of these metal-containing compounds are partially entrained when the crude oil is distilled. Thus, these compounds pass overhead with the distillates. This distilling function is especially severe in heavy crude oils during vacuum distillation to produce feed stocks for refining by catalytic processes. Thus, it is preferable to remove the metal-containing compounds from the crude oil as early as possible during its processing in the oil refinery.

Many metal-containing compounds are removed from crude oil during desalting operations merely by admixing water into the crude oil and subsequently resolving the resulting mixture. However, certain crude oils have been found in which the inorganic compounds are not removed with the water phase during desalting operations. The reasons for this result are not fully known. It has been postulated that due to some characteristic of the crude oil or the metal-containing compounds, water will not wet these compounds so that they will be removed effectively in a water phase from an intimate mixture of crude oil and water. Thus, the metal-containing compounds remain in the crude oil, and its various processed streams, so they are carried into catalytic cracking processes.

Attempts were made to remove these last-mentioned metal containing compounds from a crude oil by employing an electric treater for resolving an intimate mixture of crude oil and water in desalting operations. The treater employed an electric field to cause coalescence of the admixed water and crude oil. The amount of the metal-containing compounds removed from the crude oil by the desalting procedure left much to be desired. The addition of powerful wetting agents, and other conventional surfactants to the crude oil, did not produce any significant differences in the results obtained from the electric treater. Also, no improvement in removing metal-containing compounds from the crude oil could be foreseen by variations in temperature, electrical gradients, or spacings between the electrodes which define the electric field in the treater. It was concluded from these results that conventional desalting operations using the electric treater were incapable of acceptably removing metal-containing compounds from the crude oil.

SUMMARY OF THE INVENTION

In accordance with the present invention, there is provided a process for removing inorganic metal-containing compounds, including silica and silicates from crude oil which comprises dispersing water into the crude oil in the presence of an oxyalkylated amine-derived surfactant, and resolving electrically the resulting dispersion.

BRIEF DESCRIPTION OF THE DRAWING

The drawing is a schematic flow diagram of a two-stage desalting operation in which the process of the present invention can be employed.

DESCRIPTION OF SPECIFIC EMBODIMENTS

The process of the present invention may be practiced upon crude oil obtained from any source and in any suitable electric treater capable of resolving electrically water and crude oil dispersions. In crude oils characterized by metal-containing compounds that may be removed by conventional desalting operations, the present process removes more effectively such metal-containing compounds. However, the present process is especially suited for removing most effectively, metal-containing compounds which are not readily removed by conventional desalting operations. Thus, although the characteristics of the crude oil and the metal-containing compounds may vary depending upon geological origin and methods of production and transportation, the present process is generally applicable to all crude oils and metal-containing compounds.

The present process can be practiced in any suitable electric treater capable of resolving electrically water and crude oil emulsions or dispersions. For example, the apparatus illustrated in U.S. Pat. 2,387,250 can be employed for such purpose. However, the construction and operation of the electric treater is not critical to the present process. It needs only to provide a suitable electric field and phase separating conditions in which a water and crude oil dispersion may be coalesced or resolved electrically into separate crude oil and water phases. For example, electrode spacings which define the electric field in the treater can vary between about 3 and about 11 inches. The electric potential applied to these electrodes can vary the gradient of the electric field between about 1000 and about 10,000 volts per inch. The magnitude of the gradient, or the applied potential, within the electric treater is not critical to the practice of the present process.

Although a single electric treater may be employed to carry out the present process, it is preferred to employ two electric treaters arranged for series flow of the crude oil. Such an arrangement may be termed a two-stage (electric treater) desalting operation. The term "desalting" is used herein to denote a process which is commonly used for processing crude oils for removal of any salt that is carried with them. Desalting is also intended to apply equally to the processing of any crude oil by employing admixed water and subsequent electrical resolution of the resultant mixture into crude oil and water phases.

Referring now to the drawing, there is shown a two-stage desalting operation conducted with two electric treaters 11 and 12 interconnected for series flow of the crude oil. The crude oil passes first through the treater 11 and then through the treater 12. The treaters 11 and 12 are shown identical in construction. Therefore, the various elements will be described specifically relative only to the treater 11. It is to be understood that the treater 12 has the same elements designated by the like reference numerals carrying the subscript $a$ for the purposes of the present description.

The treater 11 is formed of a horizontally disposed cylindrical metallic vessel 13 which carries an inlet 14, a crude oil outlet 16 and a water outlet 17. The inlet 14 connects to a perforated pipe distributor 18 which extends substantially through the length of the vessel 13. A horizontally disposed grounded electrode 19 is superimposed above an energized electrode 21 suspended from insulators 22 within the vessel 13. The electrode 21 is energized from a transformer 23 mounted upon the exterior upper surface of the vessel 13. The transformer 23 provides a high-voltage, alternating current flow through an insulated cable 24, a feed-through bushing 26 and interconnecting lead 27 to the energized electrode 21. During operation of the treater 11, a water-oil interface 28 is maintained within the vessel 13 by a level control system 29. The system 29 is activated by a float 31 to operate, by an interconnecting function shown by chain line 32, a motor valve 33 connected to the water outlet 17. In a similar manner, the flow through inlet 14 may be controlled by a motor valve 34, and the flow through the crude oil outlet 16 may be controlled by a motor valve 36.

Raw crude oil, from any source, is passed into the manifold assembly 37. The crude oil is moved by a pump 38 through the manifold 37 and a heat exchanger 39 where its temperature is increased to a suitable level before entering the treater 11 through the inlet 14. The crude oil may be heated in the heat exchanger 39 by steam. Generally the temperature of the crude oil is raised to approximately 150° F., or higher, before being introduced into the treater 11. The fluids within the treater 11 may also be heated, if desired. Increased temperatures facilitate the desalting of the crude oil.

A surfactant, selected in accordance with the present invention, is introduced into metering line 41 from any suitable source. The surfactant is moved through the line 41 by a pump 42 to pass through a metering valve 43 before entering the manifold 37. In the manifold 37, the surfactant and crude oil are intimately mixed as they pass through the pump 38 which serves the combined function of moving and mixing the crude oil and surfactant in the manifold 37.

Fresh water, from any suitable source, is introduced into water supply line 44. By fresh water, for purposes of the present invention, is meant a water which may be potable water, or a water having an inorganic mineral content sufficiently low, that it can extract salt or inorganic compounds from crude oil by the present process. The water is moved through the line 44 by a pump 47 to pass into interconnecting line 48. The water then flows through metering valve 49 and mingles with the crude oil and surfactant moving in manifold 37. The mixture of the crude oil, surfactant and water in the manifold 37 is further intimately admixed by passing through the flow-control, motor valve 34. If desired, an additional mixer may be employed in the manifold 37 downstream of line 48.

The fluid mixture in manifold 37 enters the treater 11 through the distributor 18. The mixture flows upwardly through the interface 28 into the electric field established between the electrodes 19 and 21. The mixture, or dispersion, is resolved electrically into a crude oil phase having a lesser density than water that passes from the vessel 13 through the crude oil outlet 16. The aqueous materials, (including water and the water-soluble and wetted-materials) from the crude oil, gravitate through the interface 28 and are removed through the water outlet 17. This removed aqueous material from salt-laden crude oil is generally considered to be brine which is sent to a suitable disposal facility. In some instances the passage of the crude oil through the treater 11 provides a suitable reduction in the amount of inorganic compounds in the crude oil. However, in many cases the crude oil may yet contain sufficient salt that a subsequent step of desalting is required. When this occurs, it will be desirable to repeat the step of adding the surfactant to the crude oil and then admixing fresh water.

Where it is desired to employ a second stage of desalting operation, the treated crude oil from the outlet 16 is passed through the control valve 36 into a line 51. A surfactant, selected in accordance with the present invention, is introduced through the metering line 52 and moved by pump 53 through a metering valve 54 to intermix with the treated crude oil in the line 51. The admixed liquids then are passed jointly into a manifold 56. Fresh water from the line 44 is introduced through the valve 57 into the manifold 56. The resultant mixture, or dispersion, of treated crude oil, surfactant and water is passed through a motor control valve 58 into the inlet 14a of the treater 12. The treater 12 functions in the same manner as the treater 11 and produces an effluent crude oil in overhead line 59 and an aqueous material carrying extracted water-soluble materials and water-wetted inorganic compounds in an effluent water line 61. The effluent water is relatively fresh water and may be passed by a pump 63 through an interconnecting line 62 into the manifold 37 for admixing with the raw crude oil. Where this use of the effluent water is not desired, line 62 may be omitted.

The amount of water intermixed with the crude oil is used in small amounts up to about 20% by volume. The water seldom will be required above 10% by volume based upon the crude oil. In most instances, good results are obtained with water additions between 2.5 and 15% by volume. In particular, the addition of the water has been described for a desalting operation on the crude oil. Where desired, or where the crude oil contains no salt, the present process may be carried out in exactly the same manner as has been described for the crude oil desalting operation.

It is preferred for best results to mix the surfactant with the crude oil prior to the addition of fresh water. The surfactant, in some instances, has been found to be preferentially drawn, at least to some degree, into the dispersed water phase if the water is introduced into the crude oil prior to the surfactant. This reduces the surfactant's effectiveness by detracting from the desired removal of inorganic compounds from the crude oil.

As mentioned earlier, the surfactant may be characterized as an oxyalkylated amine-derived compound. Ethylene oxide and propylene oxide alkylated amines are surfactants of a well recognized class in surface chemistry. Many members of this class are known for producing surface active effects.

It is well known that alkylene oxides will react with any material containing an active hydrogen. The product of their reaction is an alcohol which obviously contains an active hydrogen. Therefore, it will react further to form eventually extended alkyloxy chains, which are partly hydrophilic and partly hydrophobic. If the initial material is a hydrophobic compound of suitable molecular weight, a surface active compound having certain hydrophobic-hydrophilic properties occurs after a sufficient number of alkyloxy groups have been added. In the present process, the initial amine-containing materials can be hydrophobic compounds having a molecular weight from, for example, about 150 to about 1500. Alkylene oxides are condensed or reacted with this initial amine-containing material until the resultant product has a molecular weight ranging from, for example, about 800 to about 27,000.

Propylene oxide may be condensed with an amine-containing material such as a polyalkylamine, to form the initial amine-containing material. Then the resulting material is reacted with sufficient ethylene oxide to give the desired molecular range and resulting surfactant characteristics determined by the hydrophobic-hydrophilic properties of the material.

Surfactants of the oxypropylated oxyalkylated polyamine series are especially suitable for the present process. In particular, good results are obtained with a surfactant which is the based catalyzed reaction product of tetraethylenepentamine which has been oxyalkylated first with propylene oxide and then with ethylene oxide to provide a certain hydrophobic-hydrophilic property that makes the resultant material capable of removing the inorganic compounds from crude oil containing dispersed water.

The surfactants may be generally described as oxyalkylated amine-derived surface active compounds, of which the preferred types are the oxypropylated, oxyethylated polyamines.

The surfactants of this invention being oxyalkylated yield products having $-(OA)_n$ units attached to the base oxyalkylatable unit (an amine-containing material).

$(OA)_n$ is derived from any suitable $\alpha,\beta$ alkylene oxide, for example, alkylene oxides of the formula:

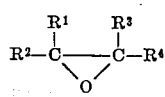

where $R^1$, $R^2$, $R^3$, $R^4$ are hydrogen or a substituted group, such as alkyl, cycloalkyl, aryl, etc., for example ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e. ethylene carbonate, propylene carbonate, butylene carbonate, etc. In addition alkylene oxides of the glycide, methyl glycide, etc. type and their equivalents can also be employed.

$(OA)_n$ denotes (1) homo units for example $-(OEt)_n-$, $-(OPr)_n-$, $-(OBu)_n$, $-(O\,Octyl)_n-$

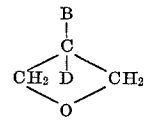

etc., (2) block units, $-(OEt)_a(OPr)_b-$, $-(OEt)_a(OBu)_b-$ $-(OPr)_a(OEt)_b(OPr)_c-$, $-(OEt)_a(OPr)_b(OBu)_c-$

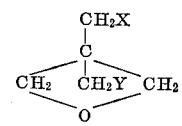

etc. where $a+b+c=n$; (3) hetero units containing random mixtures of more than one oxide $(OEt-OPr)_n$, $(OPr-OBu)_n$, $(OEt-OBu)_n$, wherein the ratio of each oxide to the other is for example 1–99 to 99–1; (4) heterohomo units for example $(EtO)_a(EtO-PrO)_b$, $(EtO)_a(PrO)_b(EtO-PrO)_c$ $(EtO-PrO)_a(BuO)_b$ etc.

In addition, derivatives of $(OA)_n$ can be derived from an oxetane (e.g. $\alpha$-$\gamma$ alkylene oxides) for example those of the formula $$\begin{array}{c} B \\ | \\ C \\ CH_2 \diagup \; | \; \diagdown CH_2 \\ \diagdown \; D \; \diagup \\ O \end{array}$$

where B and D are hydrogen or a substituted radical, for example alkyl, aryl, cycloalkyl, alkenyl, aralkyl, etc.

In addition, B and D can be substituted such as where the oxetane is derived from pentaerythritol and derivatives thereof. Examples of such oxetanes can be found in the American Chemical Society Monogram "The Pentaerythritols" by Berlow et al. (Reinhold 1958), chapter X. Preferred embodiments of such pentaerythritol-derived oxetanes include those of the formula $$\begin{array}{c} CH_2X \\ | \\ C \\ CH_2 \; | \; CH_2 \\ CH_2Y \\ O \end{array}$$

where X and Y are halogen, cyano, hydroxy and alkoxy.

Since many of the present surfactants may be block polymers containing blocks or segments of alkylene oxide units which may be added sequentially, oxyalkylation can be a stepwise procedure. For the sake of simplicity of presentation, the surfactant will be illustrated by employing as a base oxyalkylatable compound R'H and by employing only ethylene, propylene, and butylene oxides with the understanding that other hydrophobe oxides can be used in place of propylene and butylene oxides such as amylene oxide, octylene oxide, styrene oxide, oxetanes, etc. These are shown in the following table.

TABLE I

Step I (1) $R'(EtO)_nH$
(2) $R'(PrO)_nH$
(3) $R'(BuO)_nH$
(4) $R'(MO)_nH$
(5) $R'(PrO-BuO)_nH$
    MO=mixed EtO—PrO Step II Reaction of the Step I product with one of the five oxides or mixtures employed in Step I, which oxide had not been reacted in the immediately preceding step. For example:

(6) R′(EtO)$_n$(PrO)$_m$H
(7) R′(EtO)$_n$(BuO)$_m$H
(8) R′(EtO)$_n$(MO)$_m$H
(9) R′(EtO)$_n$(PrO—BuO)$_m$H
(10) R′(PrO)$_n$(EtO)$_m$
(11) R′(PrO)$_n$(BuO)$_m$
(12) R′(PrO)$_n$(MO)$_m$
(13) R′(PrO)$_n$(PrO—BuO)$_m$H
(14) R′(BuO)$_n$(EtO)$_m$H
(15) R′(BuO)$_n$(PrO)$_m$H
(16) R′(BuO)$_n$(MO)$_m$H
(17) R′(BuO)$_n$(PrO—BuO)$_m$H
(18) R′(MO)$_n$(EtO)$_m$H
(19) R′(MO)$_n$(PrO)$_m$H
(20) R′(MO)$_n$(BuO)$_m$H
(21) R′(MO)$_n$(PrO—BuO)$_m$H
(22) R′(PrO—BuO)$_n$(EtO)$_m$H
(23) R′(PrO—BuO)$_n$(PrO)$_m$H
(24) R′(PrO—BuO)$_n$(BuO)$_m$H
(25) R′(PrO—BuO)$_n$(MO)$_m$H

Step III

The products of Step II can be reacted with one of the five epoxides or mixture of oxides which had not been reacted in the immediately preceding step, i.e. either EtO, PrO, BuO, MO, or PrO—BuO, with the above exclusion as to the epoxide just reacted. This will be illustrated as follows:

(26) R′(EtO)$_n$(PrO)$_m$(EtO)$_x$H
(27) R′(EtO)$_n$(PrO)$_m$(BuO)$_x$H
(28) R′(EtO)$_n$(PrO)$_m$(MO)$_x$H
(29) R′(EtO)$_n$(PrO)$_m$(PrO—BuO)$_x$H
(30) R′(EtO)$_n$(BuO)$_m$(EtO)$_x$H
(31) R′(EtO)$_n$(BuO)$_m$(PrO)$_x$H
(32) R′(EtO)$_n$(BuO)$_m$(MO)$_x$H
(33) R′(EtO)$_n$(BuO)$_m$(PrO—BuO)$_x$H
(34) R′(EtO)$_n$(MO)$_m$(EtO)$_x$H
(35) R′(EtO)$_n$(MO)$_m$(PrO)$_x$H
(36) R′(EtO)$_n$(MO)$_m$(BuO)$_x$H
(37) R′(EtO)$_n$(MO)$_m$(PrO—BuO)$_x$H
(38) R′(EtO)$_n$(PrO—BuO)$_m$(EtO)$_x$H
(39) R′(EtO)$_n$(PrO—BuO)$_m$(PrO)$_x$H
(40) R′(EtO)$_n$(PrO—BuO)$_m$(BuO)$_x$H
(41) R′(EtO)$_n$(PrO—BuO)$_m$(MO)$_x$H
(42) R′(PrO)$_n$(EtO)$_m$(PrO)$_x$H
(43) R′(PrO)$_n$(EtO)$_m$(BuO)$_x$H
(44) R′(PrO)$_n$(EtO)$_m$(MO)$_x$H
(45) R′(PrO)$_n$(EtO)$_m$(PrO—BuO)$_x$H
(46) R′(PrO)$_n$(BuO)$_m$(EtO)$_x$H
(47) R′(PrO)$_n$(BuO)$_m$(PrO)$_x$H etc.

Step IV involves the oxyalkylation of the products of Step III. Step V involves the oxyalkylation of Step IV. Further oxyalkylations involve Steps VI–X or higher.

Although the above represent compounds having only one oxyalkylatable group, compounds having a plurality of oxyalkylatable groups can also be employed, for example

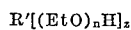

R′[(EtO)$_n$H]$_z$

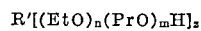

R′[(EtO)$_n$(PrO)$_m$H]$_z$

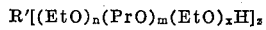

R′[(EtO)$_n$(PrO)$_m$(EtO)$_x$H]$_z$ etc.
where z represents the number of oxyalkylatable groups, for example 2, 3, 4, etc.

The following are non-limiting examples of oxyalkylatable amines that may be oxyalkylated to yield suitable surfactants:

n-Butyl amine
Dibutyl amine
2-ethylhexyl amine
Di(2-ethylhexyl) amine
Monoisopropanolamine
Diisopropanolamine
Methyl isopropanolamine
Butyl isopropanolamine
Hexylamine
Dihexylamine
Heptylamine
Octylamine
Dioctylamine
Decylamine
Furfurylamine
Dodecylamine
Monoethanolamine
Diethanolamine
N-methyl ethanolamine
N-ethyl ethanolamine
n-Amylamine
Di-n-amylamine
Sec-amylamine
N-ethylbutylamine
2-amino-4-methylpentane
4-amino-2-butanol
5-isopropylamino-1-pentanol
N-butylaniline Similarly, secondary high molecular weight aliphatic amines known as Armeen 2C and Armeen 2HY can be used.

Also, high molecular weight aliphatic amines known as Armeen 10, Armeen 16D, Armeen HTD, Armeen 18D, and Armeen CD can be used.

Suitable amines having an aromatic ring include alpha-methylbenzylamine and alpha-methylbenzylmonoethanolamine.

Other amines include:

2-amino-2-methyl-1-propanol
2-amino-2-methyl-1,3-propanediol
2-amino-2-ethyl-1,3-propanediol
3-amino-2-methyl-1-propanol
2-amino-1-butanol
3-amino-2,2-dimethyl-1-propanol
2-amino-2,3-dimethyl-1-propanol
2,2-diethyl-2-amino ethanol
2,2-dimethyl-2-amino ethanol
3-amino-1,2-butanediol
4-amino-1,2-butanediol
2-amino-1,3-butanediol
4-amino-1,3-butanediol
2-amino-1,4-butanediol
3-amino-1,4-butanediol
1-amino-2,3-butanediol
Tris-(hydroxy methyl) amino methane Amines having ring structures of course include aniline, diphenylamine, cyclohexylamine, dicyclohexylamine, and various comparable amines with alkyl substituents in the ring.

A monoamine compound can be cyclic or non-cyclic. Those which are cyclic may be heterocyclic as in the case of morpholine and its derivatives or oxazolines which may be regarded as derivatives of N-acyl-2-aminoethanols. This would apply where instead of being a derivative of monoethanolamine the oxazoline was a derivative of a low molal acid or a high molal acid and 2-amine-2-methyl-1,3-propanediol.

One may use polyamines corresponding to the formula

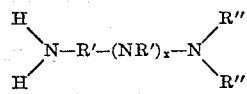

X=0, or greater (for example 1–10 or greater) in which R″ is hydrogen, alkyl, cycloalkyl, aryl, or aralkyl and R′ is a divalent radical such as

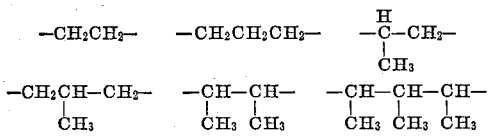

Examples of suitable amines include:

Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine
Polyethyleneimines

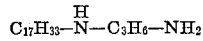

Other polyamines in which the nitrogen atoms are separated by a carbon atom chain having 4 or more carbon atoms include the following: Tetramethylenediamine, pentamethylenediamine, and especially hexamethylenediamine.

Other suitable amines are exemplified by ethylenebisoxypropylamine,

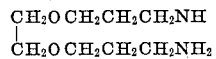

and derivatives obtained by treating ethylenebisoxypropylamine with 1, 2, 3, or 4 moles of ethylene oxide, propylene oxide, butylene oxide, or the like.

Other compounds including those having cyclic structures include piperazine, and the corresponding derivatives obtained by treating piperazines with alkylene oxides. The same applies to substituted piperazines such as the 2,5-dimethylpiperazine.

As to mono-substituted dialkanol piperazine see U.S. Pat. No. 2,421,707, dated June 3, 1947, to Malkemus.

Another example of polyamine which may be employed as a reactant is the kind described as "Duomeens."

Duomeen is a trademark designation for certain diamines. Duomeens have the following general formula:

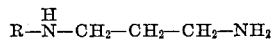

R is an alkyl group derived from a fatty acid or from the mixed fatty acid as obtained from certain oils. The specific Duomeen and the source of the radical R are as follows:

Duomeen 12—R=lauric
Duomeen C—R=Coconut oil fatty acid

Similarly, a comparable diamine, presumably obtained from Rosin Amine D and acrylonitrile, can be prepared. The structure of Rosin Amine D is as follows:

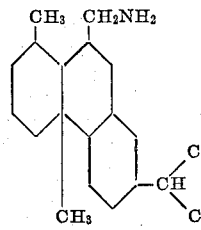

Polyamines from monoamines and cyclic imines, such as ethylene imine.

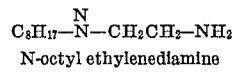
N-octyl ethylenediamine

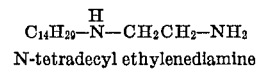
N-tetradecyl ethylenediamine

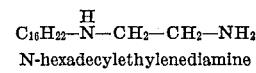
N-hexadecylethylenediamine

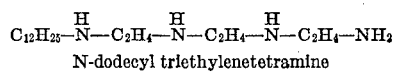
N-dodecyl triethylenetetramine

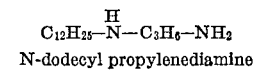
N-dodecyl propylenediamine

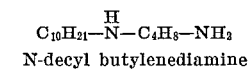
N-decyl butylenediamine

It is to be noted that all the above examples show high molal groups, i.e., 8 carbon atoms or more. The same derivatives in which methyl, ethyl, propyl, butyl, amyl, acryl groups, or the like, appear instead of octyl decyl, etc., are equally satisfactory.

Suitable amides derived from amines of the kind described previously are suitable as reactants for the present purpose. Such amides are shown as follows:

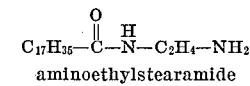
aminoethylstearamide

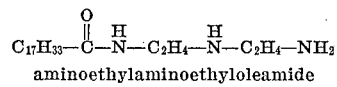
aminoethylaminoethyloleamide

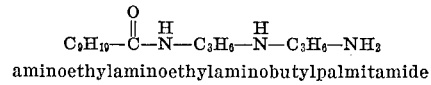
aminoethylaminoethylaminobutylpalmitamide

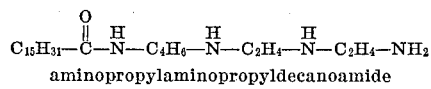
aminopropylaminopropyldecanoamide

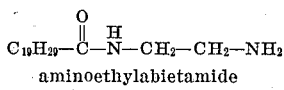
aminoethylabietamide

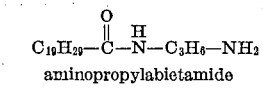
aminopropylabietamide

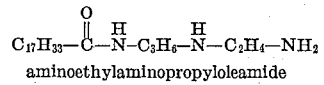
aminoethylaminopropyloleamide

Diamides may be obtained from polyamines and 2 moles of acid.

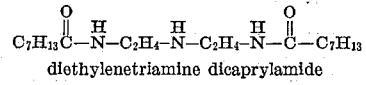
diethylenetriamine dicaprylamide

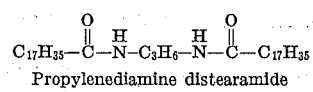
Propylenediamine distearamide

Polyamides are derived from polycarboxy acids as well as monocarboxy acids. Thus it is possible to get polyamides by using acids containing more than one carboxyl group, as illustrated in the following examples:

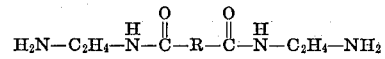

R—(COOH)$_2$=Emery dimeric acid available commercially and said to be dilinoleic acid.

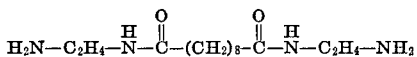

Amino amides can be obtained from polyamides in which there is a terminal tertiary amine radical having a basic nitrogen atom. Another procedure involves the production of an amino amide from a polyamine in which the terminal radicals are either primary or secondary followed by alkylation of the amide so as to convert the residual terminal radical into a basic tertiary amine radical. Another procedure is to use a secondary amine, such as dibutylamine or dihexylamine, and react stepwise with ethylene imine or propylene imine. The polyamine so obtained contains a basic tertiary amino radical. The acylation of such a polyamine results in an amino amide which will form complexes comparable to those obtained from a basic tertiary amine. Examples of such amino amides are as follows:

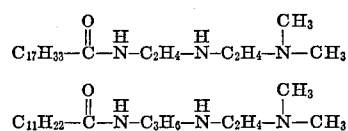

It is to be noted that all the above examples show high molal groups, i.e., 7 carbon atoms or more. The same derivatives in which methyl, ethyl, propyl, amyl, butyl, hexyl groups, or the like, appear instead of groups having 9, 17, 19 carbon atoms or the like, are equally satisfactory.

This process is practiced by employing the surfactant in a small but sufficient amount to effect the desired removal of metal-containing compounds from crude oil. The surfactant amount, in crude oil, may be from about 5 to 1000 p.p.m., or more, for example about 10 to 750 p.p.m., such as about 20 to 500 p.p.m., but preferably about 40 to 100 p.p.m. Larger or smaller amounts may be employed but the most effective amounts consistent with costs should determine the specific surfactant and the amount employed.

The following surfactant examples are presented for purposes of illustration and not of limitation.

TABLE II.—AMINO-CONTAINING SURFACTANTS

| Ex. | Surfactant type | Composition, molar ratio of alkylene oxides based on one mole of starting material |
| --- | --- | --- |
| 1 | Oxyalkylated tris (hydroxymethyl) amino methane (tris). | Tris plus 5 EtO plus 30 PrO. |
| 2 | Oxyalkylated tris (hydroxymethyl) amino methane (tris) (HOCH$_2$)$_3$CNH$_2$. | Tris plus 75 PrO plus 35 EtO. |
| 3 | do | Tris plus 2 EtO plus 10 PrO. |
| 4 | do | Tris plus 4 EtO plus 8 BuO. |
| 5 | Oxyalkylated polyalkylene polyamines. | Triethylene tetramine plus 10 EtO plus 50 PrO. |
| 6 | do | Triethylene tetramine plus 20 PrO plus 5 EtO. |
| 7 | do | Diethylenetriamine plus 14 EtO plus 30 PrO. |
| 8 | do | Tetraethylenepentamine plus $x$ moles PrO plus $y$ moles EtO.[1] |
| 9 | Oxyalkylated polymerized alkanolamine. | Heat polymerized triethanolamine plus 2 EtO plus 10 PrO. |
| 10 | do | Acylated (oleic) heat polymerized triethanol amine plus 5 EtO plus 15 PrO. |
| 11 | do | Heat polymerized triethanolamine plus 25 PrO plus 5 EtO. |
| 12 | Oxyalkylated amine-modified phenol-aldehyde resins. | p-tert-butylphenol-formaldehyde resin (approximately 5–6 phenolic units) plus 1 diethanolamine plus 1.5 EtO. |
| 13 | do | p-tert-Amylphenol-formaldehyde resin (approx. 5–6 phenolic units) plus 1 morpholine plus 2 EtO plus 10 PrO. |
| 14 | do | p-tert-Butylphenol-formaldehyde resin (approx. 5–6 phenalic units) plus 1 diethylamine plus 1 EtO plus 15 PrO. |

[1] Where $x$ ranges from 70–140 and $y$ ranges from 40 to 90.

The following patents described specific demulsifiers which are particularly stable according to this test.

(1) U.S. Patents 2,944,983 and 2,944,984 which relate to oxyalkylated tris(hydroxymethyl) amino-alkanes such as methanes, ethanes, etc.

(2) U.S. Patent 2,944,985 which relates to oxyalkylated polyamines such as triethylenetetramine.

(3) U.S. Patents 2,247,573, 2,468,181, 2,589,199, 2,589,200 and 2,589,201 which relate to polymerized alkanol amine and derivatives thereof.

(4) U.S. Patents 2,792,369–2,792,373 which relate to oxyalkylated polyamines such as tetraethylene pentamines.

(5) U.S. Patents 2,771,454, 2,854,414, 2,854,415, 2,854,416, etc., which relate to oxyalkylated amine-modified phenol-aldehyde resins.

Where a surfactant is employed which is not amine-containing, such as a non-amine containing oxyalkylate, then this demulsifier may be employed in conjunction with the amine, for example, those described above. In certain instances it may be advantageous to blend these surfactants with other surfactants.

EXAMPLE

A laboratory two-stage pilot desalter was provided to duplicate operation-wise the desalting operation and plant illustrated in the drawing. The raw crude oil had a gravity of about 40° API, 68 parts per thousand barrels of salt and inorganic compounds providing 29 parts per million of iron. These compounds contained a substantial proportion of iron sulfides and oxides. The crude oil to each desalter was mixed intimately at 200° F. with 32 parts per million of a surfactant, and then with 5% by volume of fresh water. The electric field in the interelectrode space had a gradient of 5.0 kv./inch.

The crude oil from the first stage desalter had a salt content of 1.0 part per thousand barrels and 2.5 parts per million of iron.

The treated crude oil from the scond-stage desalter admixed first with 36 parts per million of the surfactant and then 5% by volume of fresh water produced an effluent crude oil having a salt content of 0.15 part per thousand barrels and 1.0 part per million of iron.

The laboratory test was repeated but the surfactant omitted from the crude oil-water mixture supplied to the second stage desalter. The effluent crude oil had a salt content of 0.15 part per thousand barrels and 2.4 parts per million of iron.

The surfactant was the base catalyzed reaction product of one mole of tetraethylenepentamine which had been oxyalkylated first with 117 moles of propylene oxide and then with 72 moles of ethylene oxide.

As is quite evident, other oxyalkylated amine-derived surfactants are known or will be constantly developed which could be useful in this invention. It is, therefore, impossible to attempt to describe the invention in its broader aspects in terms of specific names of surfactants used as it would be too voluminous and unnecessary since one skilled in the art could by following the procedures described herein select the proper agent. This invention lies in the use of surfactants and the physical form thereof used in carrying out this invention and their individual composition is important only in the sense that their properties can effect this function. To precisely define each specific chemical composition useful as a surfactant in light of the present disclosure would merely call for knowledge within the skill of the art in a manner analogous to a mechanical engineer who prescribes, in the construction of a machine, the proper materials, and the proper dimensions thereof. From the description in this specification and with the knowledge of a chemist, one will know or deduce with confidence the surfactant suitable for this invention. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any suitable surfactants that can perform the function stated herein can be employed.

From the foregoing, it will be apparent that there has been herein described a process for removing inorganic solids from crude oil which is especially effective. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for removing inorganic metal-containing compounds including silica and silicates from crude oil which comprises dispersing water into said crude oil in the presence of an oxyalkylated amine-derived surfactant wherein the amine precursor has a molecular weight of between about 150 and about 1,500 and said surfactant having a molecular weight of between about 800 and about 27,000, and resolving electrically the resulting dispersion.

2. The process of claim 1 wherein said water is employed in amounts between 2.5 and 15 volume percent of the crude oil.

3. The process of claim 1 wherein said surfactant is an oxypropylated oxyethylated polyamine.

4. The process of claim 3 wherein said surfactant is the base catalyzed reaction product of tetraethylenepentamine which has been oxyalkylated first with between 70 and 140 molecular weights of propylene oxide and then with between 40 and 90 molecular weights of ethylene oxide.

5. The process of claim 1 wherein said surfactant is introduced into the crude oil prior to dispersing of said water into the crude oil.

6. The process of claim 1 wherein the crude oil resolved electrically from the dispersion has said water dispersed thereinto in the presence of said surfactant, and then resolving electrically the resulting dispersion.

7. The process of claim 1 for separating inorganic iron-containing compounds from crude oil which comprises desalting the crude oil in the presence of an oxyalkylated polyalkylene polyamine as said surfactant.

8. The process of claim 7 wherein said surfactant is an oxypropylated oxyethylated polyamine.

9. The process of claim 7 wherein said surfactant is introduced into the crude oil prior to desalting said crude oil.

10. The process of claim 7 wherein the crude oil priorly subjected to desalting is subsequently desalted in the presence of said surfactant.

References Cited
UNITED STATES PATENTS

| | | | |
|---|---|---|---|
| 2,387,250 | 10/1945 | Eddy | 204—190 |
| 2,552,534 | 5/1951 | De Groote | 252—344 |
| 2,792,371 | 5/1957 | Dickson | 252—344 |
| 3,334,038 | 8/1967 | Lucas | 204—190 |

HOWARD S. WILLIAMS, Primary Examiner

N. A. KAPLAN, Assistant Examiner

U.S. Cl. X.R.

252—344